United States Patent [19]

Van de Walle et al.

[11] Patent Number: 5,078,779
[45] Date of Patent: Jan. 7, 1992

[54] BINDER FOR THE GRANULATION OF FERTILIZERS SUCH AS AMMONIUM SULFATE

[75] Inventors: Richard H. Van de Walle, Columbia, Md.; David Smith, Kearneysville, W. Va.

[73] Assignee: Martin Marietta Magnesia Specialties Inc., Hunt Valley, Md.

[21] Appl. No.: 278,631

[22] Filed: Dec. 1, 1988

[51] Int. Cl.$^5$ ............... C05G 1/00; C05G 3/00; C05C 3/00
[52] U.S. Cl. .................................. 71/63; 71/60; 71/61; 71/64.06; 106/600; 106/627
[58] Field of Search ............... 71/36, 64.06, 74, 60, 71/61, 63; 106/106, 600, 627; 423/525

[56] References Cited

U.S. PATENT DOCUMENTS

| | | | |
|---|---|---|---|
| 3,476,544 | 11/1969 | Vasan | 71/64.06 X |
| 3,907,538 | 9/1975 | Hauschild | 71/34 |
| 4,838,941 | 6/1989 | Hill | 106/106 |

FOREIGN PATENT DOCUMENTS

| | | | |
|---|---|---|---|
| 0065785 | 4/1985 | Japan | 71/64.06 |
| 0145982 | 8/1985 | Japan | 71/64.06 |

Primary Examiner—Ferris H. Lander
Attorney, Agent, or Firm—Herbert W. Mylius; Alan G. Towner; Gay Chin

[57] ABSTRACT

A binder composition is taught for the granulation of fine particulate fertilizer, which binder comprises an admixture of reactive carbonate, sulfate, silicate strengthener, and water dispersant, said binder being reactive in the presence of an acid activator.

10 Claims, No Drawings

BINDER FOR THE GRANULATION OF FERTILIZERS SUCH AS AMMONIUM SULFATE

BACKGROUND OF THE INVENTION

This invention relates to a binder for the granulation of a dry, stable particulate fertilizer, such as ammonium sulfate, utilizing conventional commercially available granulating devices, to prepare a relatively uniform blend of granules of a specific desired sizing for use as a fertilizing material.

A commonly utilized fertilizer material is dry ammonium sulfate, which for convenience is usually granulated to a specified size range for application. The grain size of ammonium sulfate varies considerably according to the method of manufacture. Usually, the crystal size can vary between 0.1 mm and 2 mm. The use of such small grain sizes in fertilizers presents a problem of blending with other granulated primary nutrients, with respect to segregation. Also, such small crystal sizes are not ideal for direct application to the field through fertilizer applicators.

The fertility of varying soils often requires the application of more than one nutrient for the correction of nutritional deficiencies in the soil. While it is common practice to produce granular, multiple-nutrient fertilizers, in which each granule contains the primary nutrients nitrogen, phosphorous, and/or potassium in a definite predetermined ratio, a specific ratio will not always meet the requirements of a specific soil. Thus, a producer of fertilizers has either to produce a great number of nitrogen-phosphorous-potassium type fertilizers in granular form, or to physically mix together the primary nutrients as individual granules. Granular ammonium sulfate would, if suitably available, be an appropriate primary nutrient source of nitrogen and sulfur for such blending.

These mechanically mixed fertilizers, or bulk blended fertilizers, allow the production of an infinite number of ratios in regard to their content of primary nutrients. Bulk blending is, however, only a practical proposition as long as the fertilizer materials used in the preparation of the bulk blended fertilizer are well granulated and have not only a close, but also a very similar, spectrum of sizings. Accordingly, it has become increasingly important to closely control the granule size of various nutrient materials. It has previously been difficult to achieve the formation of granules of ammonium sulfate within very narrow size ranges in a practical manner in conventional granulating devices, such as a rotating drum or pan, or a blunger. Attempts to granulate such salts in these devices have produced a wet crystalline pulp during the wetting of the cascading bed, which could not be coalesced and agglomerated into spheres. One process, which was developed by the National Fertilizer Development Center of the Tennessee Valley Authority (TVA), may be used for the production of a granular ammonium sulfate. In this process, sulfuric acid and ammonia are pre-neutralized in a reactor to an $NH_3:H_2SO_4$ molar ratio of 1:1. The pre-neutralized fluid which usually contains less than 10 percent free water, and has a temperature of about 150° C., is then fully ammoniated and granulated in a TVA drum granulator operating at a recycle ratio of about 1:1. The heat evolved during the ammoniation makes the drying of the granules superfluous. The granules discharged from the drum are cooled and screened. The over-size is disintegrated and recycled to the double-deck screen, while the fines are returned to the drum granulator. This process produces spherical granules, but its use is dependent upon the availability of cheap ammonia. In addition, the ammonium sulfate produced in this manner is usually not competitive with by-product ammonium sulfate from coke ovens.

In U.S. Pat. No. 4,277,253, a method is taught for the preparation of dry, stable granular material from water-soluble potassium and ammonium salts, or a mixture thereof, by subjecting a dispersion of crystals of the salt in an aqueous liquid to the action of a granulating device in the presence of calcium sulfate hemi-hydrate and a hydrophilic surface-active agent to effect agglomeration of said crystals, and thereafter subjecting the agglomerated crystals to a drying operation. Thus, gypsum and a hydrophilic surface-active agent are used in a dispersion of a salt, such as ammonium sulfate which is sprayed onto dry crystals in a drum or pan granulator or pug mill. This technique necessitates the addition of extra equipment to mill ammonium sulfate to a finer particle size, then dissolve the same to make a granulation fluid to spray onto other ammonium sulfate crystals. Also, high levels of calcium sulfate are required to give agglomerates of good quality, at the expense of greatly reduced nitrogen value.

What has been needed for some time has been a granulation technique which utilizes commonly operated granulating equipment, and is capable of recovering fines or reduced size ammonium sulfate, and agglomerating the same into a carefully controlled size range. Most fertilizer granulators operating in the United States are of the continuous ammoniation-granulation type. In such a plant, potassium sulfate and other dry nutrient-containing materials are measured continuously by gravimetric belt feeders. Liquid raw materials, such as anhydrous ammonia, nitrogen solutions, sulfuric acid, or phosphoric acid, are measured continuously by metering. Both liquid or dry materials are fed into a rotating drum or granulator, where products are intimately mixed and agglomeration takes place. After the initial granulation phase, the product passes through a rotary dryer and cooler. The cooled product is screened to separate the on-size product from over-size and fines. Over-size material is crushed and rescreened, and fines are recycled back into the ammoniator-granulator. The TVA and the United States Department of Agriculture have contributed a wealth of additional information to the granular process over the last three decades. Circular Z-18, published in November 1970 by the TVA and the National Fertilizer Development Center, entitled "Producing Granular Fertilizers," describes in detail typical granulation techniques for fertilizers.

Raw materials used in such granulation processes usually vary in size from as small as, for example, −325 mesh to as large as the minimum size specification of the finished product. Great care must be exercised in determining the proportions of various sized raw materials to be included in granulating product so as to produce a final mix which granulates at an efficient rate. Maximum level of on-size finished product, particularly when no binder is used, is produced when a variety of sizes of raw material is included in the raw material feed. This, however, tends to significantly increase the cost of the final product. At the same time, the specific nutrient material levels must be maintained at the required specification in order to meet the desired formulation.

Many raw material products available to the fertilizer granulator are more economically priced if the granulator can use reduced size or "fines" of the raw material. Raw materials such as ammonium sulfate, and others, are frequently available to the fertilizer granulator in a reduced sizing at a reduced cost. Maximum economy in such cases depends upon maximum use levels. In addition, there is often raw material available which is considered "distressed goods," as it is no longer in condition to be used for bulk blended product.

If a proper balance of fertilizer chemistry, binder, and raw material size balance is not met, granules which are formed during granulation are often weak and readily disintegrate to powder during handling and use. Dustiness in the product can become excessive, causing extreme handling and flow problems during transfer and in fertilizer application equipment. Certain other raw materials and raw material combinations, when used at the most economically desirable levels, draw excessive moisture to the finished granules, thus limiting storage and shelf life and causing excessive caking in storage bins, finished product piles, and fertilizer application equipment. One class of such ingredient which may be used in combination with ammonium sulfate, and which frequently exhibits this characteristic, is urea and urea combinations. A granular urea-containing composition encompassing calcium sulfate and calcium phosphate is taught in U.S. Pat. No. 4,283,423. Various possibilities have been proposed to avoid such caking when utilizing urea in fertilizer manufacture. They include "dusting" a conditioning agent on the manufactured granule. Such dusting agents include starch, clays, and calcium sources, as described in U.S. Pat. No. 3,332,827. This method is less than satisfactory, as it requires additional equipment and, at best, only coats particles of the granule, thus providing only partial relief from the caking.

SUMMARY OF THE INVENTION

It is therefore the object and advantage of this invention to provide a binding medium for granulated fertilizer, such as ammonium sulfate, which increases the level of raw material fines which may be used, and enables one to maximize the yield of "on-size" granules.

Another object of the invention is to provide a binder which promotes a free flowing granular fertilizer material of a vary narrow granule sizing. Another object of the invention is to provide a product with binding ability which is useful in agglomerating high concentrations of raw material finEs into a granular consistency as a complete mixed fertilizer or for ultimate use in fertilizer bulk blending applications.

Another object of the invention is to provide a binding medium which increases the rate of agglomeration, and produces a higher level of on-size product in ammonium sulfate granulation.

DESCRIPTION OF PREFERRED EMBODIMENTS

The novel combination binder for use in the granulation of fertilizer materials such as ammonium sulfate comprises a mixture of reactive carbonates and sulfates in combination with a silicate strengthening agent and a water-dispersing agent. A reactive acid, such as sulfuric acid, is utilized to initiate reaction between the sulfate salt and the metal ion of the carbonate, to form a complex salt to bind the fertilizer material together. The silicate material further provides a quick initial set to the granules and assists in formation of uniform granule sizing.

The reactive carbonate salt may be selected from calcium carbonate, dolomite, magnesium carbonate, potassium carbonate, ammonium carbonate, other carbonates, and mixtures thereof. The preferred carbonate for the present invention is calcium carbonate. The reactive carbonate may comprise from 60 percent to 85 percent of the binder composition, preferably from about 65 percent to about 75 percent, and most preferably about 70 percent of the binder composition.

The reactive sulfate may be selected from langbeinite, kieserite, magnesium sulfate salts, potassium sulfate salts, other sulfate salts, and mixtures thereof. The preferred sulfate salt for use in the present invention comprises langbeinite. The sulfate salt may comprise from about 15 percent to about 40 percent by weight of the binder formulation, preferably from about 20 percent to about 35 percent by weight, and most preferably from about 28 percent to about 30 percent of the binder formulation.

The silicate strengthening agent may preferably be potassium silicate, but may also be any other suitable commercially available material which will enhance granular green strength. The potassium silicate may comprise from about 0.5 to 5.0 percent by weight of the binder formulation, preferably from about 0.5 to 2.0 percent, and most preferably about 1 percent of the binder formulation.

The dispersant composition may be any water dispersing agent, such as polymethacrylate, bentonite, sodium phosphate, lignin sulfonate, organic dispersing agents, etc. The preferred dispersant for use in the present binder formulation is polymethacrylate. The water dispersing agent may be present in a concentration of from about 0.10 percent to about 3.0 percent by weight of the binder formulation, preferably from 0.10 to about 2.0 percent, and most preferably from about 0.10 to about 0.50 percent by weight of the binder formulation.

The binder composition of the present invention is intended to be provided to the fertilizer manufacturer or mill operator in powder form, in bags, barrels, or in bulk. To activate the binder mix, it is necessary to provide a liquid acid so as to cause the carbonate to evolve carbon dioxide and provide free ions to react with the water soluble sulfate salt to thereby form a complex salt binder. Suitable acid activators include sulfuric acid, nitric acid, hydrochloric acid, phosphoric acid, other inorganic acids, and such organic acids as acetic acid. Sulfuric, nitric, and phosphoric acids are preferred, as they are additional sources of fertilizer values.

Depending upon the particle size of the crystals to be agglomerated, the amount of granulation binder may vary from a minimum of about 1 percent by weight of final product to about 10 percent. The preferred range of granulation binder is from about 3 percent to about 6 percent by weight of the final agglomerated product, with about 3 to 5 percent by weight being the most preferred concentration of granulation binder in the granular product. For use as a granulation binder, the component mixture may be added to the crystals and batch blended before being processed in a granulation apparatus, i.e., drum granulator, pan granulator, pug mill, or any other device designed to upgrade particle size; or the binder may be fed directly into the system via a rate control device so that the desired rate of binder addition may be obtained in a continuous process operation. After the binder and fertilizer material are introduced into the granulation device, an acid activator, i.e., 92 percent to 93 percent sulfuric acid, is introduced into the granulator at a controlled rate of one-half to three-fourths of the weight of the binder, the preferred means of introduction of the acid being via a spray system, so that good dispersion in the granulator bed material is obtained. However, sparger systems or the TVA "pipe" reactor may be used. Water may also be introduced into the granulator at a metered rate which is appropriate to obtain the desired granule size. The rate of water usage will vary, depending upon the granulation device used, drying load, etc., and may be determined experimentally for each batch operation or for each individual fertilizer material source.

The binder of the preferred embodiment composed primarily of a calcium carbonate salt, which reacts to evolve carbon dioxide in the presence of acid. The free calcium ions are then available to react with the water soluble langbeinite to form complex salt combinations thereof. Thus, the acid is present to initiate reaction of the carbonate and sulfate. Also present is the water soluble silicate, which adds to the initial strength of the green granules to aid in their transfer from the granulator to the drying apparatus. This silicate strengthening agent also allows a quick initial set to the granules in the dryer, until the free water that is usually added to facilitate granulation begins evaporation, and the crystals of the complex salt combinations begin formation to cement the granules together. A small amount of the water dispersing chemical is beneficial to reduce the amount of water needed to facilitate granulation, and to reduce the heat requirement load on the dryer system. In the preferred embodiment of the invention, ammonium sulfate fines and carbonate/sulfate/acid/water binder are allowed to granulate, with the wet granules being collected from the discharge end of the granulator and transferred by any convenient conveying/transport equipment into the drying apparatus, normally of the rotary type, wherein the free water may be evaporated and main constituents of the binder begin cementing the agglomerates together. The dried granules are then transferred to a screening operation, where the desired size granules are collected for packaging.

The normally desired size range of fertilizer granules is from to 6 to 16 mesh. That is, the particles will pass through a standard 6 mesh screen, and remain on the surface of a 16 mesh screen. The undersized granules (minus 16 mesh) may be recycled to the granulator, and the oversized (plus 6 mesh) granules may be run through a crushing operation and reintroduced to the screening system.

A factor in providing the reactive carbonate and sulfate components of the binder composition of the present invention is the particle size of such components. Appropriate particle sizes may range from not greater than −16 mesh U.S. sieve to −325 mesh U.S. sieve scale or smaller. The most desirable sizing is from −60 mesh to −325 mesh.

The acid activator component of the present invention may be present as concentrated acid or as water-diluted acid. In either event, the amount of water present in the total mixture may be determined and adjusted by the operator at the time of granulation, so as to obtain the most favorable results.

As previously indicated, the ammonium sulfate fines and the novel binding agent of this invention are preferably intimately mixed and physically blended in the dry form. The dry mix is then fed into the granulator or pelletizer, and the water and acid are then mixed with the dry components. The components of the binder, i.e., the carbonate and sulfate materials, are activated during this phase, to form the complex sulfate binder salt. After granules have been formed in the pelletizing or granulating phase, they are next fed to a dryer system. As indicated, the typical dryer system is a rotary type in which product is fed continuously into one end of the rotary drum with heat supplied at the end to which the product is fed. Heated air is forced through the drum as it rotates and granules are dried at from about 100° F. to about 220° F. or higher. Other drying systems adequate for this purpose could also be used. An additional unique aspect of this invention is the effect that the binder has on the energy utilized to dry the product. A significant reduction in total drying requirement is often noted, as seen by exit temperature, as a result of the reactive mechanism of the binder.

There appears to be no upper limit to the level of fines, or the specific range of fine ammonium sulfate which may be treated with the binders of the present invention, as long as adequate binder material and liquid phase is maintained, in the presence of sufficient silicate and acid activator to both assist initial agglomeration and initiate or activate the novel binder of this invention. While the present description of the invention emphasizes the granulation of ammonium sulfate fines, it should be noted that the invention is broadly applicable to nitrogen, phosphate, and potassium fertilizers in general, and to "full analysis" or "complete mix" fertilizers specifically.

The following illustrative examples are not intended to limit the scope of this invention, but only to show practical application of its use.

EXAMPLE 1

Under plant conditions, three tests were conducted using five percent binder as set forth in the present invention. The binder formulation utilized comprises 70 percent calcium carbonate, 28.9 percent potassium-magnesium sulfate (langbeinite), 1 percent potassium silicate, and 0.10 percent sodium polymethacrylate. In Test 1, the agglomerated material was sampled at the pug mill discharge point. In Test 2, the composition consisted of binder, ammonium sulfate, and enough urea to maintain a 20 percent nitrogen level in the final product. Test 2 sampling was after the pug mill discharge to the pan granulator for one minute. In Test 3 utilizing 5 percent binder, sampling was after the pug mill discharge to the pan granulator for one minute. The samples were dried in an oven overnight and the following screen tests obtained.

| Screen Size, Tyler | Test 1 % Retained | Test 2 % Retained | Test 3 % Retained |
| --- | --- | --- | --- |
| 6 | 12.7 | 26.7 | 16.9 |
| 6 × 16 | 68.6 | 67.8 | 76.9 |
| −16 | 18.7 | 5.4 | 6.7 |

It is noted that the percentage of on-size (6×16) product was excellent in each case, with the pan granulated product somewhat higher than straight pug mill agglomerated material (Test 1). In this plant test, the activating sulfuric acid was present in the amount of one-half to three-forths of the weight of the binder composition. Thus, for each 100 pounds of binder per ton of product, sulfuric acid was present in the amount of 50 to 75 pounds per ton. The pH of the wet granules from the granulator is about 2.0.

EXAMPLE 2

A comparative plant trial was conducted to demonstrate the superiority of granules produced using five percent binder of the present invention over granules produced using lignin sulfonate as a binder at 0.5% addition.

More durable granules were produced using the binder of the present invention, as reflected by granule crushing strength and percent attrition. In addition, the present binder composition displayed more ability to keep material non-caking and free flowing than the lignin sulfonate binder.

The ammonium sulfate granules produced using 0.5% lignin sulfonate displayed a reduced critical relative humidity compared to ammonium sulfate granulated using the binder of this invention. Moisture pick-up was observed at 70% relative humidity for the 0.5% lignin product while the product manufactured with this invention recorded no moisture pick-up at this relative humidity level.

Free flow tests on granules manufactured with 0.5% lignin tended to cake more quickly than those granules manufactured with binder of this invention, as evidenced by results below.

The granules prepared in accordance with the present invention also had an advantage in on-size 6×16 mesh material with 89.6 percent on-size compared with 85.2 on-size for the lignin sulfonate binder added product.

|  | Lignin Sulfonate (0.5%) | Invention (2%) H$_2$SO$_4$ |
|---|---|---|
| Crushing Strength (lbs.) | 3.7 | 4.4 |
| Attrition (%) | 0.45 | 0.03 |
| Noncaking Test, 70% RH @ 70° F. | | |
| Zero Tap (gms) | 0.9 | 39.0 |
| 1 Tap (gms) | 39.1 | 0.7 |
| 2 Tap (gms) | 0.1 | — |
|  | Note: 1.0 gm Wt. Gain Starting Wt. 39.1 gms | Note: 0.7 gms Wt. Loss Starting Wt. 40.4 gms |
| Screen Test % Passing | | |
| #6 | 88.5 | 98.3 |
| #14 | 8.4 | 23.2 |
| #16 | 3.3 | 8.7 |

The above examples demonstrate the superiority and utility of the present invention, which is capable of providing granular ammonium sulfate of a desired-size range. It is to be understood that the above description of the present invention is susceptible to various modifications, changes, and adaptations by those skilled in the art, and that the same are to be considered to be within the scope of the present invention, which is set forth by the claims which follow.

We claim

1. A reactive binder composition for the granulation of ammonium sulfate, said composition being reactive in the presence of an acid activator and water and consisting essentially of an admixture of from about 60 to about 85 percent by weight of a reactive carbonate, selected from the group consisting of calcium carbonate, dolomite, magnesium carbonate, potassium carbonate, ammonium carbonate, and mixtures thereof from about 15 to about 40 percent by weight of a reactive sulfate, selected from the group consisting of langbeinite, kieserite, magnesium sulfate salts, potassium sulfate salts, and mixtures thereof from about 0.5 to about 5 percent by weight silicate strengthener, and from about 0.1 to about 3.0 percent by weight of a water dispersant selected from the group consisting of polymethacrylate, bentonite, sodium phosphate, lignin sulfonate, and organic dispersing agents.

2. A binder as set forth in claim 1, wherein said silicate is potassium silicate.

3. A binder as set forth in claim 1, consisting essentially of from about 65 to about 75 percent by weight reactive carbonate, from about 20 to about 35 percent by weight reactive sulfate, from about 0.5 to about 2 percent by weight silicate strengthener and from about 0.1 to about 2 percent by weight water dispersant.

4. A binder as set forth in claim 3, wherein said reactive carbonate is calcium carbonate, said reactive sulfate is langbeinite, said silicate is potassium silicate, and said water dispersant is polymethacrylate.

5. A binder as set forth in claim 3, consisting essentially of about 70 percent by weight calcium carbonate, from about 28 to about 30 percent by weight langbeinite, about 1 percent by weight potassium silicate, and from about 0.1 to about 0.5 percent by weight polymethacrylate.

6. A binder composition for the granulation of particulate fertilizer, said composition being reactive in the presence of an acid activator and water and consisting essentially of an admixture of from about 60 to about 85 percent by weight of a reactive carbonate, selected from the group consisting of calcium carbonate, dolomite, magnesium carbonate, potassium carbonate, ammonium carbonate, and mixtures thereof from about 15 to about 40 percent by weight of a reactive sulfate, selected from the group consisting of langbeinite, kieserite, magnesium sulfate salts, potassium sulfate salts, and mixtures thereof from about 0.5 to about 5 percent by weight silicate strengthener, and from about 0.1 to about 3.0 percent by weight of a water dispersant.

7. A binder as set forth in claim 6 wherein said silicate is potassium silicate.

8. A binder as set forth in claim 6 consisting essentially of from about 65 to about 75 percent by weight reactive carbonate, from about 20 to about 35 percent by weight reactive sulfate, from about 0.5 to about 2 percent by weight silicate strengthener, and from about 0.1 to about 2 percent by weight water dispersant.

9. A binder as set forth in claim 8 wherein said reactive carbonate is calcium carbonate, said reactive sulfate is langbeinite, said silicate is potassium silicate, and said water dispersant is polymethacrylate.

10. A binder as set forth in claim 8 consisting essentially of about 70 percent by weight calcium carbonate, from about 28 to about 30 percent by weight langbeinite, about 1 percent by weight potassium silicate, and from about 0.1 to about 0.5 percent by weight polymethacrylate.

* * * * *

UNITED STATES PATENT AND TRADEMARK OFFICE
CERTIFICATE OF CORRECTION

PATENT NO. : 5,078,779
DATED : January 7, 1992
INVENTOR(S) : Richard H. Van de Walle et al It is certified that error appears in the above-identified patent and that said Letters Patent is hereby corrected as shown below:

Column 3, line 50, "finEs" should read --fines--.

Column 6, line 66, "three-forths" should read --three-fourths--.

Column 8, line 1, after "carbonate" delete the comma ","; line 4, after "thereof" insert a comma --,--; line 5, after "sulfate" delete the comma ","; line 8, after "thereof" insert a comma --,--; line 37, after "carbonate" delete the comma ","; line 40, after "thereof" insert a comma --,--; line 41, after "sulfate" delete the comma --,--; line 44, after "thereof" insert a comma --,--; line 46, after "dispersant" and before the period insert --selected from the group consisting of polymethacrylate, bentonite, sodium phosphate, lignin sulfonate, and organic dispersing agents--.

Signed and Sealed this

Twenty-first Day of December, 1993

Attest:

BRUCE LEHMAN

*Attesting Officer*    Commissioner of Patents and Trademarks